United States Patent Office 3,360,568
Patented Dec. 26, 1967

3,360,568
PREPARATION OF HALOGENATED
ORGANIC COMPOUNDS
Murray Hauptschein, Glenside, Pa., and Milton
Braid, Haddon Heights, N.J., assignors to Pennsalt Chemical Corporation, Philadelphia, Pa., a corporation of Pennsylvania
No Drawing. Filed Dec. 31, 1963, Ser. No. 334,915
7 Claims. (Cl. 260—601)

This application is a continuation-in-part of our copending application Serial No. 735,702 for "Halogenated Organic Compounds," filed May 16, 1958 and now abandoned.

This invention relates to a new method for preparing halogenated aldehydes and aldhydrols.

In accordance with the present invention, a new method has been found for preparing halogenated aldehydes and corresponding aldehydrols by the hydrolysis of halogenated, and especially highly fluorinated halosulfates of the formula $RCX_2CHXOSO_2X$ where R is fluorine or a haloalkyl group which is at least half halogenated (i.e. at least one-half of the hydrogens of the corresponding alkyl radical are substituted by halogen); and where X represents chlorine, fluorine or both. In many instances, particularly in the case of highly halogenated aldehydes and aldehydrols, the method of the invention provides a simpler and more economical method of preparation than is presently available.

The method of the invention may be illustrated by the hydrolysis of the chlorosulfate $CF_3CHClOSO_2Cl$ in accordance with the following:

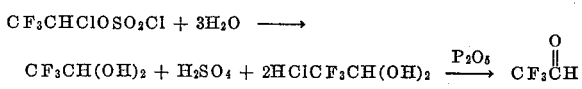

As may be seen, the reaction proceeds (from a formal standpoint) through the elimination of the halosulfate group and the conversion of the adjacent —CHX— group of the aldehydrol group. While the invention is neither limited to, nor depends upon, any particular reaction mechanism, it is believed that it proceeds according to the following:

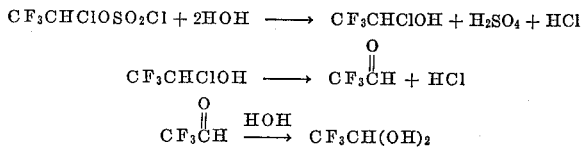

In accordance with the above, the halosulfate is first hydrolyzed to form an unstable intermediate alcohol. This intermediate then loses HCl to form the aldehyde which in the presence of water hydrates to the aldhydrol.

Regardless of the validity of the above postulated reaction mechanism, it has been found that the reaction of the invention is unique to halosulfates in which the alpha-carbon atom (i.e. the carbon atom to which the halosulfate group is attached) contains a fluorine or chlorine atom and a hydrogen atom. For example, where the alpha-carbon atom is dihydrogenated (i.e. halosulfates of the type $RCH_2OSO_2X$ where X is chlorine or fluorine) the aldehyde or aldehydrol is not formed. The halosulfate in this case undergoes hydrolysis to the corresponding alcohol $RCH_2OH$. Similarly, where the alpha-carbon is dihalogenated as in the halosulfates of the type $$RCX_2OSO_2X$$

where X is chlorine or fluorine, the halosulfate hydrolyzes to form the corresponding carboxylic acid

rather than the aldehyde or aldehydrol.

The preferred halosulfates useful as starting materials in the present invention are those in which R is fluorine or a perfluoroalkyl, a perfluorochloroalkyl, a perfluorohydroalkyl or a perfluorochlorohydroalkyl radical. Where R is haloalkyl it preferably contains from 1 to 50 and most desirably from 1 to 20 carbon atoms. As used herein, the term perfluoroalkyl means an alkyl radical containing only the elements carbon and fluorine. A perfluorochloroalkyl radical means one which contains only the elements chlorine, fluorine and carbon in which the ratio of fluorine to chlorine atoms is at least 1:1. A perfluorohydroalkyl radical means one which contains only the elements fluorine, hydrogen and carbon in which the ratio of fluorine to hydrogen atoms is at least 1:1. A perfluorochlorohydroalkyl radical means one which contains only the elements fluorine, chlorine, hydrogen and carbon and in which the ratio of chlorine plus fluorine atoms to hydrogen atoms is at least 1:1.

In the halosulfate starting materials, the sulfur of the halosulfate group is linked to the carbon atoms in the —CHX— group through an oxygen atom. These halosulfates thus have the structure

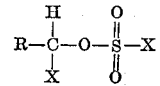

rather than the sulfonyl halide structure

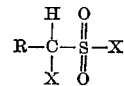

or the sulfonic acid structure

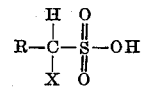

where the sulfur is connected directly to a carbon atom.

A particularly valuable class of halosulfate starting materials are those of the formula $RCX_2CHXOSO_2X$ where R is a perhalogenated highly fluorinated alkyl radical such as a perfluoroalkyl or a perfluorochloroalkyl radical. Halosulfates of this type providing perfluoroaldehydes or aldehydrals, viz, halosulfates of the formula $R_fCF_2CHXOSO_2X$ where $R_f$ is a perfluoroalkyl radical, preferably having from about 4 to 14 carbon atoms represent an especially valuable class of starting materials. From such halosulfates, perfluoroalkyl aldehydrols and aldehydes may be readily prepared. The perfluorinated aldehydrols and aldehydes where $R_f$ is a relatively long chain perfluoroalkyl group (at least 4 carbon atoms in length) have valuable surface properties due to the extremely low surface energy of the perfluoroalkyl "tail." By virtue of such properties, the perfluorinated aldehydes and aldehydrols that may be prepared from these halosulfates are useful e.g. as intermediates for the preparation of resins in which the relatively long perfluoroalkyl "tails" provide a high degree of water and oil repellency when such resins are used to impregnate or coat fabrics, leather, paper or other materials.

The halosulfates starting materials may be prepared by the reaction of a corresponding iodide $RCX_2CHXI$ with chlorosulfonic or fluorosulfonic acid following the procedures described in detail in our co-pending application Serial No. 310,479, filed September 20, 1963, now Patent No. 3,255,229 for "Halogenated Organic Compounds."

The reaction between the iodide and the acid is carried out at temperatures ranging from about +20° to +300° C. depending upon the particular iodide. The reaction is preferably carried out in the presence of a large excess of the acid. Reaction pressure is not critical, and where the iodide is not a volatile compound the reaction is most conveniently carried out at atmospheric pressure. Reaction time is likewise not critical and will be adjusted in accordance with the reactivity of the particular iodide. Excess chlorosulfonic or fluorosulfonic acid may be removed by pouring the reaction mixture over crushed ice whereupon the halosulfate, being generally water insoluble, will separate as a lower organic layer. Where the halosulfate reaction product and the halosulfonic acid are immiscible, isolation of product is effected by simple phase separation.

Typical halosulfates that may be hydrolyzed in accordance with the invention to produce the corresponding aldehydes and aldehydrols are the following:

$CF_2ClCHClOSO_2Cl$
$CF_2ClCHFOSO_2Cl$
$CF_2ClCHClOSO_2F$
$CF_3CHClOSO_2Cl$
$CF_3CHFOSO_2Cl$
$CF_3CF_2CHClOSO_2F$
$CF_2ClCFClCF_2CHClOSO_2Cl$
$CF_2ClCHCl(CF_2CHCl)_2OSO_2Cl$
$CF_2ClCHCl(CF_2CHCl)_4OSO_2Cl$
$CF_2ClCFCl[CF_2CHCl]_3OSO_2Cl$
$CF_3CF_2CF_2CF_2CHClOSO_2Cl$

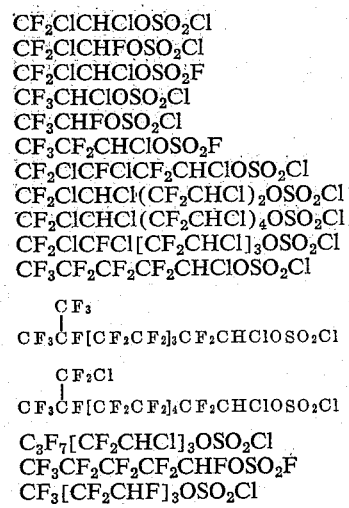

$C_3F_7[CF_2CHCl]_3OSO_2Cl$
$CF_3CF_2CF_2CF_2CHFOSO_2F$
$CF_3[CF_2CHF]_3OSO_2Cl$

The hydrolysis of the halosulfate may be carried out with water or an aqueous solution of a base such as sodium bicarbonate, potassium bicarbonate, sodium carbonate, potassium carbonate, or sodium or potassium hydroxide. The use of concentrated solutions of a strong base such as sodium hydroxide should be avoided to prevent the occurrence of undesired side reactions. When alkaline hydrolysis is employed, it is preferred to employ dilute aqueous solutions of a mild base such as sodium bicarbonate or potassium bicarbonate.

The hydrolysis temperature is not critical. While temperatures ranging from room temperature to the reflux temperature of the water or aqueous solution employed will generally be satisfactory and most convenient, lower temperatures, e.g. as low as 0° C., or higher temperatures of up to 200° C. may be employed if desired. The optimum hydrolysis temperature is readily determined by simple experiment.

The product formed (after acidification when basic hydrolysis is used) is generally the aldehydrol

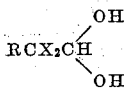

which may be recovered from the reaction mixture by the usual techniques such as by phase separation (if water insoluble) or by distillation or extraction from the aqueous layer (if water soluble) using a solvent as diethyl ether or chlorotrifluoroethane. The aldehyde may be obtained from the aldehydrol, for example by treatment with $P_2O_5$ in conventional manner.

The following examples illustrate several specific embodiments of the invention.

*Example 1.—Hydrolysis of $CF_2ClCHClOSO_2Cl$*

Approximately 1 gram of the above chlorosulfate is shaken with water overnight at room temperature. The aqueous solution is extracted with ether and the extract is dried with anhydrous calcium sulfate. After removal of the ether solvent, a portion of the residue is added to a solution of 2 grams of 2,4-dinitrophenylhydrazine in 6 N sulfuric acid. The resulting yellow precipitate is collected by filtration, triturated with dilute $NaHCO_3$, washed well with water and dried. After recrystallation from n-heptane there is obtained yellow crystals of chlorodifluoroacetaldehyde phenylhydrazone, having a melting point of 135° C. Analysis of this compound is as follows:

Calculated for: $C_8H_5O_4N_4F_2Cl$: C, 32.8; H, 1.7; N, 19.0.
Found: C, 34.1; H, 1.7; N, 19.4.

The aldehyde

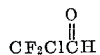

is obtained from the remaining portion of the dried ether extract by treatment with $P_2O_5$ to dehydrate the aldehydrol $CF_2ClCH(OH)_2$.

*Example 2.—Hydrolysis of $CF_2ClCHCl(CF_2CHCl)_{4av}OSO_2Cl$*

The above chlorosulfate is prepared by the reaction of the telomer iodide $CF_2ClCHCl(CF_2CHCl)_{4av}I$ with chlorosulfonic acid at a temperature of about 75° C. The starting telomer iodide for this reaction is prepared by the reaction of iodine monochloride with $CF_2=CHCl$ in accordance with Example 1 of U.S. Patent No. 3,051,764.

Hydrolysis of the chlorosulfate is effected by refluxing with an excess of water at a temperature of about 100° C. for 24 hours. The water insoluble organic layer is separated from the water layer and is treated with $P_2O_5$ to obtain the aldehyde

*Example 3.—Hydrolysis of $CF_3CHClOSO_2F$*

The fluorosulfate $CF_3CHClOSO_2F$ is shaken with an excess of water for about 15 hours at a temperature of 50° C. After cooling, the mixture is extracted with diethyl ether after which the ether extract is dried with anhydrous magnesium sulfate. The ether solvent is removed by evaporation and the residue, consisting of the aldehydrol $CF_3CH(OH)_2$ is then treated with $P_2O_5$ to obtain the aldehyde

boiling point —18° C. at atmospheric pressure.

*Example 4.—Hydrolysis of $CF_3CHClOSO_2Cl$*

Following the same procedures as in Example 3, the chlorosulfate $CF_3CHClOSO_2Cl$ is hydrolyzed to produce the same aldehyde, viz

*Example 5.—Hydrolysis of $CF_3CF_2CF_2CHClOSO_2F$*

The fluorosulfate $CF_3CF_2CF_2CHClOSO_2F$, prepared as described in co-pending application Ser. No. 310,479, filed Sept. 20, 1963 is added by drop to an excess of water at a temperature of 50° C. and the mixture is then stirred for about 10 hours. The organic layer is then separated

---

*The notation "4av" means an average of four ($CF_2CHCl$) units per molecule.

from the aqueous layer and dried over anhydrous magnesium sulfate to provide the aldehydrol $$CF_3CF_2CF_2CH(OH)_2$$

The aldehydrol is treated with $P_2O_5$ to produce the perfluoroaldehyde $$CF_3CF_2CF_2\overset{O}{\overset{\|}{C}}H$$

a colorless liquid boiling at about 30° C. at atmospheric pressure.

EXAMPLE 6—Hydrolysis of $CF_3\overset{CF_3}{\underset{|}{C}}F[CF_2CF_2]_3CF_2CHClOSO_2Cl$ The above chlorosulfate is added dropwise to an aqueous solution of sodium bicarbonate at a temperature of 50° C. and the mixture is then stirred for about 24 hours. The reaction mixture is neutralized by the addition of dilute aqueous HCl. The organic layer is separated from the aqueous layer and dried over anhydrous magnesium sulfate. There is obtained a good yield of the aldehydrol $$CF_3\overset{CF_3}{\underset{|}{C}}F[CF_2CF_2]_3CF_2\overset{H}{\underset{|}{C}}(OH)_2$$

which is then treated with $P_2O_5$ to produce the perfluoroaldehyde $$CF_3\overset{CF_3}{\underset{|}{C}}F[CF_2CF_2]_3CF_2\overset{O}{\overset{\|}{C}}H$$

The halogenated aldehydes and aldehydrols prepared by the process of the invention are useful in the preparation of resins and pharmaceuticals, and as plasticizers for various resins such as polyvinylidene fluoride, polytrifluoroethylene, polyvinylidene chloride, polyvinyl chloride, and polymethacrylate resins. The perfluoroaldehydes, especially those having a relatively long chain perfluoroalkyl group, have particularly valuable properties by virtue of the low surface energy of the perfluoroalkyl "tail."

We claim:
1. A method for preparing compounds selected from the class consisting of halogenated aldehydrols and corresponding aldehydes which comprises hydrolyzing a halogenated halosulfate of the formula $RCX_2CHXOSO_2X$ where R is haloalkyl radical which is at least half halogenated and where X is selected from the class consisting of chlorine and fluorine.

2. A method for preparing compounds selected from the class consisting of halogenated aldehydrol and corresponding aldehydes which comprises hydrolyzing a halogenated halosulfate of the formula $RCX_2CHXOSO_2X$ where R is selected from the class consisting of perfluoroalkyl, perfluorochloroalkyl, perfluorohydroalkyl, and perfluorochlorohydroalkyl radicals and where X is selected from the class consisting of chlorine and fluorine.

3. A method in accordance with claim 3 in which the hydrolytic agent is water.

4. A method in accordance with claim 3 in which the hydrolytic agent is an aqueous solution of a base.

5. A method in accordance with claim 3 in which the hydrolytic agent is an aqueous solution of a weak base.

6. A method for preparing compounds selected from the class consisting of halogenated aldehydrols and corresponding aldehydes which comprises hydrolyzing a halogenated chlorosulfate of the formula $$RCX_2CHXOSO_2Cl$$

where R is a radical selected from the class consisting of perfluoroalkyl, perfluorochloroalkyl, perfluorohydroalkyl and perfluorochlorohydroalkyl radicals and where X is selected from the class consisting of chlorine and fluorine.

7. A method for preparing compounds selected from the class consisting of perfluorinated aldehydrols and corresponding aldehydes which comprises hydrolyzing a halosulfate of the formula $R_fCF_2CHXOSO_2X$ where $R_f$ is a perfluoroalkyl radical and where X is selected from the class consisting of chlorine and fluorine.

References Cited

UNITED STATES PATENTS

| | | | |
|---|---|---|---|
| 2,568,500 | 9/1951 | Husted et al. | 260—601 |
| 2,852,569 | 9/1958 | Braid et al. | 260—601 |

LEON ZITVER, *Primary Examiner.*

R. H. LILES, *Assistant Examiner.*